United States Patent [19]

Ray et al.

[11] Patent Number: 4,609,789
[45] Date of Patent: Sep. 2, 1986

[54] VERIFICATION VIA CABLE ANALYZER

[75] Inventors: Jimmy C. Ray; H. Wayne Mathews, both of Denison, Tex.

[73] Assignee: Communications Technology Corporation, Los Angeles, Calif.

[21] Appl. No.: 707,858

[22] Filed: Mar. 4, 1985

[51] Int. Cl.$^4$ .............................................. H04M 3/28
[52] U.S. Cl. ........................ 179/175.2 D; 179/175.3 A
[58] Field of Search ................. 179/175.2 D, 175.2 C, 179/175.3 R, 175.2 R, 175, 175.3 A

[56] References Cited

U.S. PATENT DOCUMENTS

| | | | |
|---|---|---|---|
| 3,891,811 | 6/1975 | Miller | 179/175.3 A |
| 3,903,380 | 9/1975 | Schomburg | 179/175.3 A |
| 4,430,530 | 2/1984 | Kandeff et al. | 179/175.2 D |

*Primary Examiner*—Stafford D. Schreyer
*Attorney, Agent, or Firm*—Wendell Coffee

[57] ABSTRACT

A cable analyzer is capable of having a group of 25 pairs of wire from a telephone cable connected by a module to the analyzer. By a central processing unit or computer in the analyzer, a series of relays connect any one of the pair of wires to a routing board. At the routing board, a plurality of analog tests may be directed to be conducted upon the pair of wires and ground, or the wires may be routed for other purposes. The results of the analog tests are converted to binary digital format so that they may be analyzed by the central processing unit. The results are visually displayed or printed. The central processing unit has the capabilities through different programs to conduct a plurality of tests upon each pair and upon the completion of the plurality of tests, proceed to a subsequent pair for a plurality of tests. Also, changes in central office equipment to which the cable is connected results in the capability of the analyzer requesting the telephone number of the line routed by the analyzer to the central office. The analyzer prints the telephone number along with the line identification. Furthermore, the central processing unit of the analyzer has a modem thereon whereby the telephone number and the results of tests may be transmitted on standard RS232C; or the analyzer may be controlled from a remote location by RS232C transmission to the analyzer.

7 Claims, 6 Drawing Figures

|  |  |  |
|---|---|---|
|  | PAIR | TEST RESULTS |
| 116 | 0301 | -50.0DC:R |
| 112 | 0302 | POTS |
|  | 0303 | 1.75KF:RT |
| 106 | 0304 | BSYPOTS |
| 142 | 0305 | 1.85KF:RT |
| 162 | 0306 | 07639252 |
|  | 0307 | 07631607 |
|  | 0308 | 1.85KF:RT |
|  | 0309 | 1.75KF:RT |
| 132 | 0310 | .050Kr:RT |
|  | 0311 | 1.83KF:RT |
|  | 0312 | OPEN |
|  | 0313 | 07637308 |
| 124 | 0314 | .165Kr:R |
|  | 0315 | 1.80KF:RT |
|  | 0316 | -8.50DC:R |
|  | 0317 | OPEN |
| 102 | 0318 | -17.5DC:R |
|  | 0319 | POTS |
|  | 0320 | 07633451 |
| 138 | 0321 | 11%UNBAL |
|  | 0322 | 64%UNBAL |
|  | 0323 | 39.7KF:RT |
|  | 0324 | OPEN |
|  | 0325 | 11%UNBAL |

VERIFICATION VIA CABLE ANALYZER

CROSS REFERENCE TO RELATED APPLICATIONS

None. However, this application is a companion to the following pending applications, and much of the disclosure is similar to the disclosure therein:

| Title | Ser. No. | Filing Date |
| --- | --- | --- |
| Cable Analyzer with D.C. Functions | 666,836 | 10/31/84 |
| Special Circuit Transfer Via Cable Analyzer | 669,767 | 11/08/84 |

BACKGROUND OF THE INVENTION (1) Field of the Invention

This invention relates to telephone communications, and more particularly to the identification and analysis of status and condition of the pairs of wire in a telephone cable.

Applicant furthermore designates a computer designer as a person having ordinary skill in the art inasmuch as this analysis is done by computer. Therefore, this application is written so that a computer designer would be able to manufacture the unit and explain to telephone maintenance personnel the use thereof.

(2) Description of the Prior Art

The normal telephone system includes a central office where the telephone switching occurs, and from the central office extend many cables, each having many pairs of wire. These pairs of wire will extend to another central office or into the field to either individual telephones in homes or telephones or other equipment in businesses. Before this invention, it had been common practice in the telephone systems to inspect the different pairs of wire in a telephone cable in the field.

Between the central office and the phone there are numerous junction boxes or the like. Before this invention, it was known that a certain analysis could be made at these junction boxes or any point the pair was accessible. The two wires of a pair are designated in the phone system as the ring and tip. One wire being the ring and one wire being the tip of each pair. It was known that various tests could be made; e.g., the voltage determined between the ring and tip, the ring and ground, and tip and ground. Also, in the absence of voltage, the resistance from ring to tip, ring to ground, and tip to ground could be determined. It was known that if these measurements were of certain value, it could be determined whether the pair was a "plain old telephone service" (herein called POTS)" and also from this whether the pair was an idle or a busy POTS.

Typically in the standard telephone system used in the United States, the POTS will have a voltage from ring to ground of about −50 volts, plus or minus 5 volts, and the tip will have a low resistance from tip to ground. I.e., it will have a typical tip to ground resistance of 1,000 ohms, when idle. When busy, the tip to ground will have a voltage of approximately −15 volts, plus or minus 9 volts.

Also, some indication was obtained if other equipment were connected on the pair, e.g., a pay phone or an alarm system.

Furthermore, equipment existed before this invention to measure the capacitance. The capacitance between the ring and tip could be measured. The standard wire in common use would have a certain capacitance of per thousand feet. Therefore, by measuring the capacitance between ring and tip, a measurement could be obtained of the total length of wire. if the capacitance from ring to ground did not equal the capacitance from tip to ground, this difference indicated that the pair was unbalanced.

Furthermore, it was known, because of certain external conditions, the voltage of the wires would vary on an instantaneous basis. Therefore, for accuracy, no reading should be instantaneous but the average of multiple readings. Of course with structural devices, such as a volt meter having a needle indicating the volts, the inertia of the physical parts act as to average the reading inasmuch as the change in voltage would be so rapid that the needle could not physically move, but because of inertia, would average the instantaneous values.

Furthermore, many, if not most, central offices are equipped with "automatic number identification equipment" (called ANI herein) and also, many of the central offices ae equipped with "automatic number announcement converters" (called ANAC herein). Therefore, this equipment permitted a person at a terminal box in the field to dial on a pair a particular entry number or coded message request or ANI request (ANIR herein). In response to this ANIR dialed from the field, the ANI would identify the number of the line and the ANAC would announce by voice synthesizer, the telephone number of that line.

SUMMARY OF THE INVENTION (1) New Functions and Surprising Results

This invention uses a cable analyzer which is unique in several respects. First, the analyzer has two 25 pair plugs or jacks or modules.

Each module plug has 50 pin connections whereby 25 pairs of wire can be connected at one time. The preferred module plug is known in the trade as Cinch Jones, (a trademark). The analyzer is computerized so that a series of tests may be conducted. I.e., the panel has a 16 key input board. By keying two keys, a particular program may be used which, for example, would conduct a series of pretests, each series of tests consisting of 9 individual tests upon each of the pair connected to the modular connection. Results of the test can be visually displayed and printed so that the analysis of each of the pair of wires within the 25 pair could be verified.

As stated above, there are two of the modular connectors. One is identified as an old modular connection for an old cable, and the other is identified as a new modular connection, so named to be connected to a new cable. In such a test, parameters of one of the pairs of wire on the old module or old cable can be compared to the parameters of the pairs upon the new module. If the parameters match between the old and new, a tone can be placed upon the air in the old module to see if the same tone is received on the pair in the new module, and therefore, identity or connection between the old and the new pairs can be established. Furthermore, the analyzer has a signal generator built within it. The signal generator, capable, under the control of a computer, or central processing unit (called CPU herein) can produce DTMF (dual tone multiple frequency) or can produce pulse dial tones. Therefore, the system can operate in connection with an ANI and ANAC to determine the telephone number upon the line, if it is an idle POTS line with an identifiable number. This requires the central office ANAC and ANI to be modified so that the number is announced in DTMF code rather than by a voice synthesizer.

The different tests as performed by the analyzer (such as voltage, resistance, and capacitance) are all conducted as analog tests, and therefore, it is necessary to translate or change the analog information into binary digital form. Central processing unit, besides having the programs on "programmable read only memory" units (called PROM); also has memory units as "random access memory" (called RAM).

In addition to having the RAMS, PROMS and integrated circuit, the CPU will also have a clock. In addition to the computer control, the clock will also generate a 612 KHZ signal and a 4.8 KHZ signal which will be transmitted to various components of the analyzer such as a converter, where the analog to digital conversion takes place as well as other functions.

As a result of these capabilities, the analyzer can make and perform numerous tasks and print out the results or the conclusion of these many tests in written form in much shorter time than they could be performed otherwise.

In addition, the central processing unit translates its output into RS232C mode or language and is programmed to receive commands in RS232C mode. Therefore, the output of the analyzer, which is normally made available at the analyzer, can equally well be transmitted to a remote location and either displayed at a remote location or printed at a remote location. Likewise, the control of the unit which is normally controlled from the front panel of the unit, can be controlled by the RS232C input code from a remote location.

In addition, according to this invention, the analyzer itself, is only 22" (55.88 cm) wide by 8" (20.32 cm) high and 10.5" (26.67 cm) deep. The entire unit weighs only 28 pounds (12.7 Kg.) including the rechargeable battery power supply.

(2) Objects of this Invention

An object of this invention is to analyze the wire pairs and verify the telephone numbers of the pairs in a telephone cable.

Another object is to display and record the condition including telephone number of each pair in the cable.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
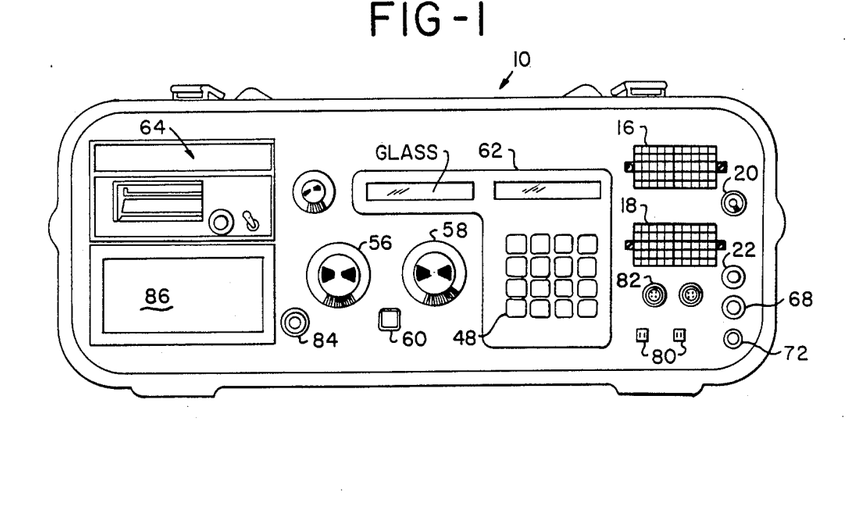
FIG. 1 is a front elevational view of the front panel of the cable analyzer.
Figure 2:
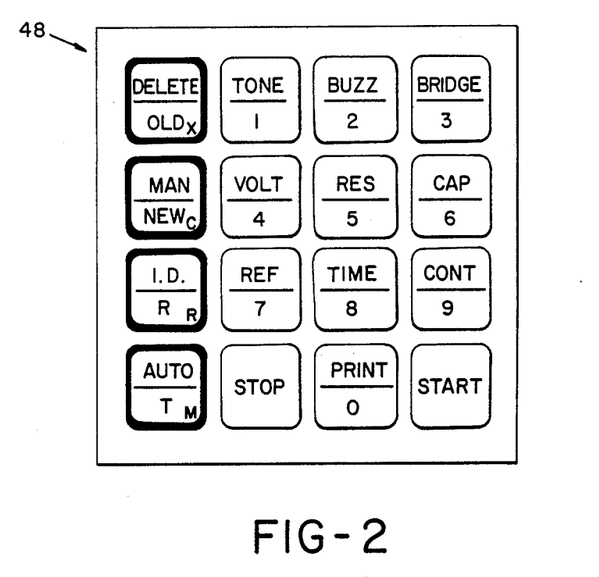
FIG. 2 is a front elevational view of the 16 key pad.

Referring to the drawings, and more particularly to FIGS. 1 an 2, there may be seen cable analyzer 10. The analyzer will include batteries 12 which may be recharged by plug in wall transformer 14 through power supply 15. The analyzer will have a 25 pair connector 16 which is designated as the old module or old connector 16. As mentioned before, it generally bears the designation of Cinch Jones. There is also a 25 pair connector 18 designated as the new connector which again is a 50 pin connector. In addition to the 25 pair connector, there is a single jack or old receptacle 20 to connect a single pair as well as a single pair new receptacle 22.

Figure 3:
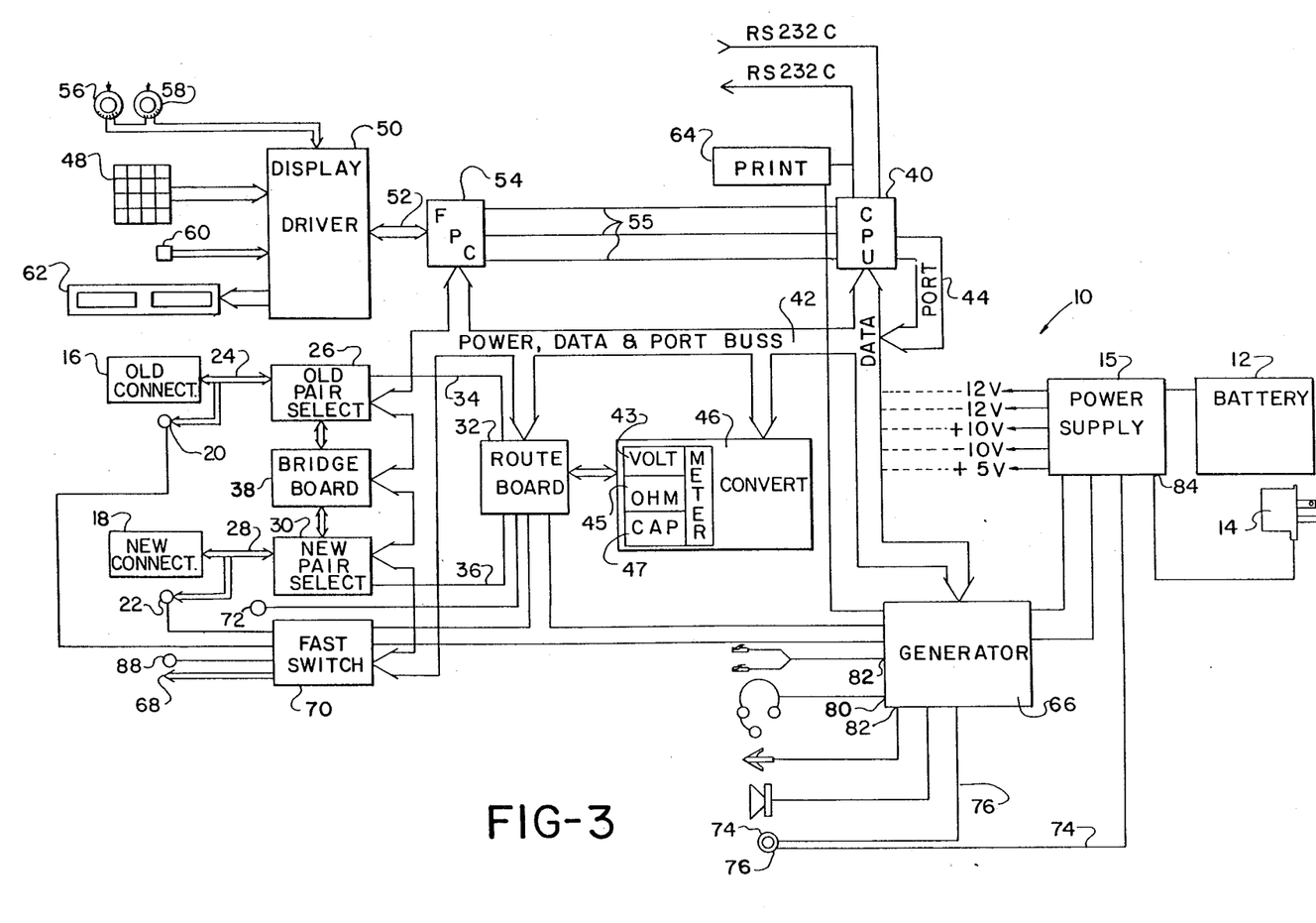
FIG. 3 is a schematic representation of the operation of the cable analyzer.

The pins of the old connector 16 are connected by hardwiring or old ribbon 24 to an old pair selector board 26. Likewise, new connector 18 is connected by a new hardwire ribbon 28 to the new pair selector board 30. Each pair selector board has 26 double pole relays. By these relays, any one of the pairs in both the old connector 16 and old receptacle 20 may be connected to routing board 32. The connection of one of the pairs from the old connector or old receptacle to the routing board is by old buss 34, as shown. Likewise, the connection between the relays of the new pair selector and the routing board is by the new buss 36.

Bridge board 38 connects both to the old pair selector 26 and the new pair selector 30. It also has 26 double pole/double throw relays. By the bridge board 23, any pair from the old module can be connected or bridged to the corresponding pair of the new module or connector 18.

Central processing unit 40 (called CPU herein) controls the pair selection and routing, and basically all other functions of the analyzer. Besides the basic integration chip, the CPU will include a plurality of PROM chips which will contain the programs for the analyzer. It will also contain several RAM chips. Also, a clock in the CPU produces 612 KHz and 4.8 KHz signals for the various components. The CPU 40 is connected by both data buss 42 and port buss 44 to the old pair selector 26, the new pair selector 30, the bridge board 38 and the routing board 32. It is by operation of the CPU 40 that a particular pair is selected to be connected by relay to the routing board. The CPU signals the particular test to be performed upon them. Also, it is the signal from the CPU 40 that directs the individual relays in the bridging board 38 to bridge one of the pairs from the old connector 16 to the corresponding pair on the new connector 18.

The routing board 32 is connected by a plurality of connectors to analog to binary digital converter 46. The converter 46 does more than merely convert, it processes the analog signals. For example, normally the first test which is mad upon a pair as determined by the CPU 40 is to measure the voltage from ring to ground, tip to ground, and ring to tip. Therefore, after the CPU has directed the converter 46 to make the voltage readings these voltage readings are stored in the RAMS of the CPU 40. Then the voltages are analyzed by the CPU and compared to certain standards as contained in the PROMS. Likewise, ohmmeter 45 of the converter 46 would, upon proper command or direction from the CPU 40, determine the resistance of a designated pair between ring and ground, tip and ground, and ring to tip, convert this information to binary digital code to be transmitted to the CPU for storage and analysis. Likewise, capacitance test, ring to ground, tip to ground, and ring to tip, could be made, converted to binary digital code, analyzed and stored.

The routing board 32 does more than merely connect a pair (for example, pair number 7 as it might be designated inasmuch as the pairs in each bundle are designated from pair 1 through pair 25, ordinarily). The routing board, besides picking out one particular pair, would also route it to the particular meter, either the ohmmeter 45, volt meter 43, or capacitance meter 47 as directed. Also, it would indicate in its routing whether the measurement was to be ring to tip, ring to ground, or tip to ground.

The main input by the operator to the CPU 40 is by sixteen membrane key pad 48. The key pad is connected to display driver 50, and from there, by 40 pin ribbon 52 to front panel control 54. The front panel control is connected by the data buss 42 and port buss 44 to the CPU. Front panel control 54 is also connected to the CPU by a plurality of hard wires for standby power and reset and low battery.

In addition to the 16 key pad 48, there is an old pair selector dial 56 and a new pair selector dial 58. By these dials, manually, any pair on the old connector 16 or receptacle 20 or any pair on the new connector 18 or receptacle 22 may be selected for tests.

In addition, on the front panel there is a reset membrane switch 60 which is connected through the display driver 50 and front panel control 54 and hardwired 55 to the CPU 40.

The display driver 50 is also connected to visual display board 62 which is in the form of a dual or two panel eight character liquid crystal diode alphameric.

Thermal printer 64 is connected directly to the CPU 40 and also to generator 66. The generator has the capabilities of generating dual tone multiple frequency (called DTMF dial tones herein). The generator 66 is connected to the routing board 32. Thus, DTMF dial tones may be applied to any of the pairs and received by the generator from any pair.

Also, according to the known usage, the tone can be sent in a simplex mode so it is inaudible to someone using a telephone upon the line, but still can be distinguished by probe plugged in probe receptacle 68. Probe receptacle 68 is connected to an amplifier circuit 70 which is also connected to the generator 66. Amplifier circuit 70 also has switching capabilities and is connected to the old receptacle 20 and the new receptacle 22.

Ground lug 49 is connected directly to the routing board 32.

On/off switch 74 is combined with volume control 76. The volume control 76 is connected to the generator 66. The on/off switch 74 is connected to the power supply 15 which interconnects the battery pack 12 and the wall transformer 14. The wall transformer 14 for the batteries 12 is connected to the battery charge receptacle 84. The power supply 15 is connected to the different elements of the analyzer 10 requiring power.

Talk lugs 80, upon the front panel, are connected to the generator 66. In addition, there is a four prong talk and data receptacle 82. Both the head set for the talking and the data connectors are connected to the generator 66. Cord storage pocket 86 is within the front panel for the analyzer 10. TCX receptacle 88 on the front panel is connected to the amplifier circuit 70.

Figure 6:
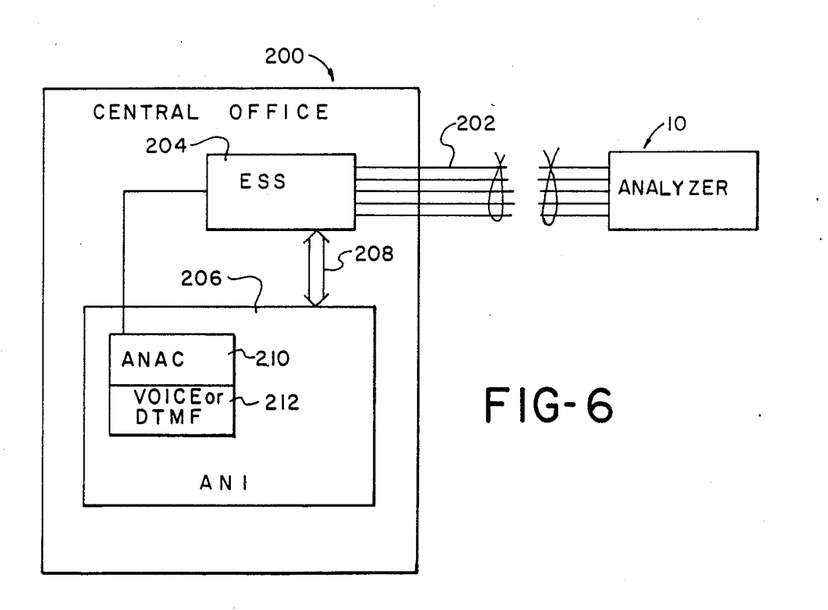
FIG. 6 is a schematic representation of a modified central office and an analyzer in the field.

Referring to FIG. 6, there may be seen a schematic representation of central office 200 and schematically a portion of the equipment therein. The central office 200 will be connected by cable 202 to other central offices or to equipment in the field. In this particular instance, as shown in the drawing, it would be connected to an analyzer 10 as described above.

The cable 202 is connected within the central office 200 to electronic switching system (ESS herein) 204. The ESS 204 is that equipment within the central offices that connects one telephone to another in response to the touch tone or dialed pulses. Normally, an automatic number identification 206 within the central office will be connected to the ESS 204. The automatic number identification (ANI herein) will identify the line number in certain instances. This is particularly used in automatic billing for long-distance calls. The connection between the ESS and ANI is by buss 208.

In most central offices, the ANI 206 will include automatic number announcement converter (ANAC herein) 210. When a certain request (ANIR herein) is dialed upon one of the lines in the cable 202, the ESS 204 will connect that line to the ANAC 210. Then, the ANAC 210 will report the number by a voice synthesizer according to present technology and according to known usage before this invention was made.

I.e., the central office equipment 200 as described to this point including the cable 202, ESS 204, ANI 206, buss 208, and ANAC 210 were all known before this invention.

This invention adds voice option 212 to the voice synthesizer. The voice option 212 is electronic equipment which, when the ANIR is received by the ANAC 206, the voice option 212 immediately responds with a coded pulse, which in this case, is the dial tone normally found upon the the asterisk key (*) of the phone. This is the signal that indicates that machine readable code numbers are available. If no response is received by the voice option 212 within one-half of a second, the number will be reported on the line by voice synthesizer. However, if the proper response is received, the number will be reported by a machine digital mode, preferably, by dual tone multiple frequency. The preferred toe is that tone produced by the regular number or pound key (#) upon standard telephone touch tone systems. When this tone is received, then the ANAC 210 will respond by giving the telephone number in the DTMF mode.

As discussed above, the generator 66 of the analyzer 10 will receive this tone, and this tone will be processed by the CPU 40 so that it is displayed and printed.

EXAMPLE OF FUNCTION

To give an example of certain functions of the system, a verification program will be described. The verification is to obtain information about the telephone numbers, D.C. voltage, resistance, and capacities of the wires and pairs within a 25 pair group in the cable.

The verification program is useful with the pretest program, i.e., it is useful so that working, faulty, and vacant pairs are readily identified. It is also useful in verifying which telephone numbers are upon which lines, and it is therefore particularly useful in making periodic inventories of the system, either for accounting purposes to make sure that all assigned numbers are being charged to customers and also to make certain that all lines are available, etc.

To perform a pretest, a group of wires terminating in a modular connection is connected to the old connector plug 16. The analyzer 10 is grounded, preferably to the cable sheath. Then, with the set on, the operator presses the key pad marked "REF" as seen in FIG. 3 and then presses the key pad marked "4" as seen in FIG. 3. After the key pads "REF, 4" have been pressed, the display will shown "ENTER ANIR NO". At this point, the operator would enter the ANI number, e.g. the operator would key in 200 777 7777 (a ten digit number). Those skilled in the telephone art will understand that different central offices would have different ANIR numbers and whatever the number was for that particular central office would be the number keyed in. After this was done, the operator would press "START". At this time, the display would show "DTMF OR PULSE". The operator would then touch either "1" for DTMF or "2" for PULSE, according to the equipment which was available at the central office. Since normally DTMF will be the preferred usage, it is submitted at this point as DTMF. Having done this, the operator would then press "AUTO" and "4". Then, the display would shown "PRINT?". The operator, desiring to have the results printed, would press "PRINT". The pressing of the key pads "REF, 4" and "AUTO, 4" would bring up on the CPU the proper program which is stored in the PROMS to conduct the automatic verification program. Pressing the key pad "PRINT" would command the CPU to print the results of the test.

As the first function of the "REF, 4, AUTO, 4, PRINT" program, the CPU would cause to be displayed upon the old portion of the visual display board 62 "CABLE 00". The operator could key the numbers "03" indicating that the test was being made on cable 03. Then, the CPU would store this information on one of the RAMS. Then, the operator would press "START". Then, the new display of the visual display board 62 would read "CABLE 00". There being no new cable, the operator would press "START" again. The CPU would cause the old display to read "CNT 000". The operator would enter the count, e.g., "01". The operator would then press "START" again. The new display would read "CNT 000" since there was no new cable plugged into the new pair selector board 30, the operator would press "START" again.

Figure 4:
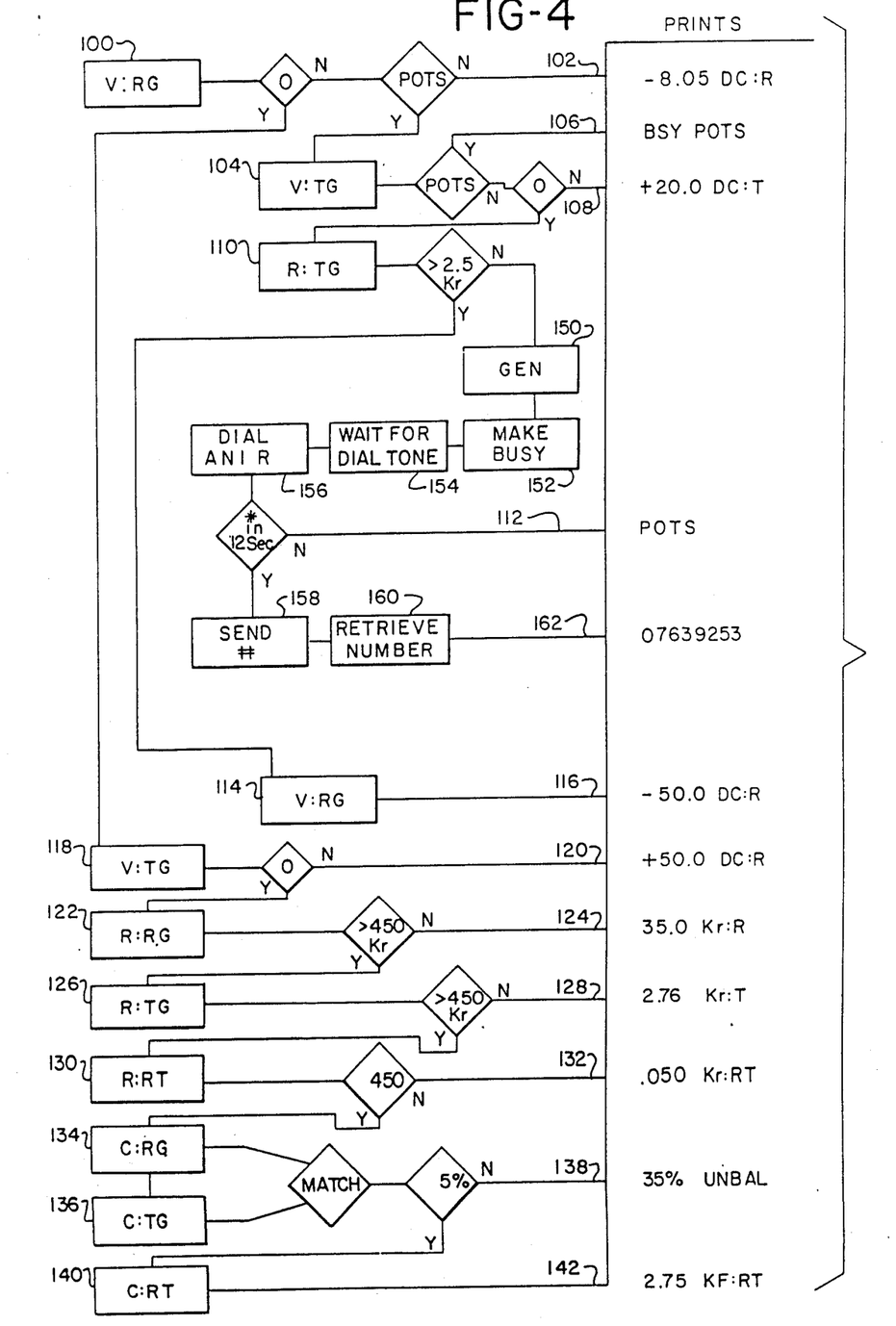
FIG. 4 is a representation of the steps taken in a pretest program.

The steps hereafter are represented in FIG. 4 and identified by numerals.

With this "START", the CPU would direct the old pair selection board 26 to connect the first pair as identified on the "Cinch Jones" connector 16 to the routing board 32. The CPU 40 would direct the routing board to connect the ring and ground to the volt meter 43. The CPU would direct the converter 46 to make multiple instantaneous readings (step 100) of the voltage from ring to ground and take the average of these voltages. The reading from the volt meter 43 will first be an analog signal related to a selected pair. The analog signal will be converted to a binary digital signal for use by the CPU. The CPU would determine if the voltage were zero. If the voltage were zero, a further test would be made, but if the voltage were not zero, then it would be determined if the voltage were within the POTS parameter (that is about −50 volts). If it were, the CPU would put this information in memory and proceed to check further for POTS parameter. On the other hand, if the voltage were present ring to ground, but this voltage did not match the parameters of a POTS, it would print (step 102) the voltage of the ring to ground and proceed to the next pair. Anytime the result is printed by the printer, then the test would proceed to the next pair.

Next, the CPU 40 would instruct the routing board 32 to connect the tip and ground to the volt meter 43, and the converter 46 to check the voltage tip to ground (step 104). There would be multiple voltage tests and the average taken by the CPU 40. The CPU would determine if the voltage were in "busy POTS" parameter. If the voltage between tip to ground were in the busy POTS parameters (that is about −14 volts) it would then identify the pair as a busy POTS, print the pair number on the tape with the identification of "busy POTS" and proceed to the next pair (step 106). The CPU would determine if the voltage were zero. If the voltage, tip to ground, were not zero, this voltage would be printed (step 108). If the voltage between the tip and ground were zero (0), then the CPU would instruct the converter to measure the resistance between tip and ground (step 110). The CPU would determine if the resistance was greater than 2.5K ohms. If the resistance were in the parameters of an idle POTS, i.e., less than about 2,5000 ohms, the CPU would identify the pair as an idle POTS.

When the CPU 40 determines that the line is an idle POTS line, it will instruct the route board 32 to connect that pair to the generator board 66. Then, the CPU will (step 150), according to the program which is applied to the CPU, cause the generator to make the busy (step 152). To make the line busy, the generator manipulates the pair so that it is the same as to take the receiver off the hook of an ordinary telephone. After the line has been made busy, the CPU instructs the generator to wait for a dial tone (step 154). As soon as the dial tone is received and the generator detects the dial tone and transmits this information to the CPU, the CPU then, at that time, directs the generator to dial the ANIR which, it will be remembered, was programmed into the program immediately after the "REF, 4" program was keyed into the analyzer 10. The dialing of the ANIR is step 156.

As discussed above, when the ANIR number is dialed, this causes the ESS 204 in the central office 200 to connect the line to the ANAC 210. Also as discussed, when this occurs, the voice program 212 of the ANAC transmits the asterisk (*) tone; if the line has a telephone number. If the line, which is a POTS line, does not have a telephone number, the ANIR will not transmit an asterisk (*) tone. Therefore, if the generator 66 of the analyzer 10 does not receive the asterisk tone within 12 seconds after dialing the ANIR, it will assume that one will not be transmitted; and therefore, will conclude that there is no telephone number on it. Therefore, in response to instructions from the CPU, the analyzer printer 64 will print POTS (step 112).

On the other hand, if the asterisk (*) tone is received within 12 seconds, the generator 66, will transmit this information to the CPU 40, and the CPU 40 will instruct the generator 66 to transmit the pound (#) tone (step 158).

The voice option 212 of the ANAC 210, when receiving the pound tone from the analyzer, will then immediately transmit the telephone number of the line in machine readable form. As discussed above, since the DTMF is the desired form, it will therefore be transmitted in DTMF.

The generator receiving the telephone number will then retrieve the telephone number (step 160), and transmit this telephone number to the CPU 40 where it will be printed (step 162). As discussed above, once the printer prints, the CPU instructs the routing board to go to the next line and commence testing upon it.

As stated before, at the point when the resistance tip to ground is measured (step 110), it will be either more than or less than 2,500. If it is greater than 2,500 ohms, then, the CPU would command the routing board to again check the voltage ring to ground (step 114). Then, this voltage would be printed (step 116) and the CPU would go on to the next pair.

If there were no voltage on ring to ground (step 100), the CPU 40 would instruct the routing board 32 to connect tip and ground to the converter 46 and voltage would be checked between tip and ground (step 118). If the voltage between tip and ground were not zero, this voltage would be printed (step 120).

If there were no voltage, either ring to ground or tip to ground, then the resistance would be measured between ring to ground (step 122). The reading of the ohmmeter 45 will be an analog signal related to a selected pair. The analog signal will be converted to a binary digital signal for use by the CPU. If this resistance were below about 450K ohms, the resistance value would be printed (step 124) and the CPU would go onto the next pair.

If the resistance value were greater than about 450K ohm, then the CPU 40 would direct the routing board 32 to connect the tip and ground to the ohmmeter 45 and the ohmmeter to measure the resistance of the tip to ground (step 126). Again, if it were below about 450K ohm, the value would be printed (step 128).

If the resistance were above about 450K ohms, the CPU would direct the board to connect the ring and tip to the ohmmeter 45 and the resistance read (step 130). If there were resistance to ring and tip below about 450K ohm, this value would be printed on the tape and the CPU would go onto the next pair (step 132).

If the resistance were above about 450K ohm, the CPU would direct that the ring and ground be connected to the capacitance meter 47, and the converter 46 to conduct a capacitance test (step 134). The reading from the capacitance meter 47 will be an analog signal related to a selected pair. The analog signal will be converted to a binary digital signal for use by the CPU. This capacitance would be stored in memory, and then the CPU would direct the routing board to connect the tip and ground to the capacitance meter. The CPU would direct the converter to determine the capacity tip to ground (step 136), and then this value would be compared at the CPU 40 to the value of the capacitance ring to ground. If they were not about the same value (the difference less than about 5%), the percent of unbalance between these capacitance values would be printed on the tape, and the CPU would go to the next pair (step 138).

If the capacitance were about the same value, then the CPU would direct the routing board to connect the ring and tip to the capacitance meter 47, and the capacitance determined between ring and tip (step 140). This value would be converted at the CPU into an equivalency of thousands of feet and this value printed on the tape, and the CPU would go to the next pair (step 142).

Figure 5:
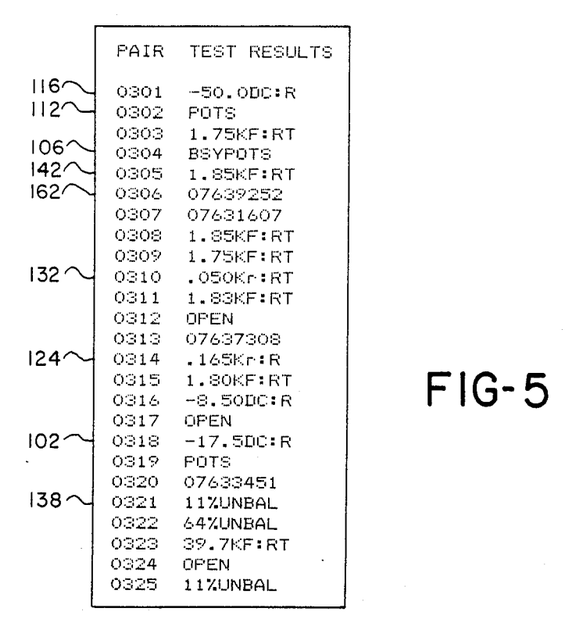
FIG. 5 illustrates an example of the tape printed from the pretest and verification program.

Referring to FIG. 5, pair 1 shows that there was −50 volts between ring and ground. However, the assumption is that the tip parameters were not that of POTS. The −50 volts ring to ground indicates certain special circuits.

Pairs 2 and 19 shows POTS. Pair 4 shows a busy POTS.

Pairs 6, 7, 13, and 20 show retrieve telephone numbers.

Pair 3 and several of the others show a length in 1,000 feet (KF.) between the ring and tip (RT.). Therefore, the analyzer shows that the length of the pair 3 line is 1,750 feet. Also, this means that there are no voltages and all resistances are greater than 450,000 ohms.

Pair 10 shows that there is a resistance ring to tip of 50 ohms (K=1,000; r=resistance in ohms). This indicates that there is a short between the ring and tip. With the knowledge of the gauge of wire being used, the distance to the fault could be calculated.

Pair 12, 17, and 24 indicate open line. This means there are no voltages and all resistances are greater than 450,000 ohms. This means that the capacitance meter indicated the length of the line was very short, meaning that probably the pair opened within a few feet of the test set.

Pair 16 and 18 show a rather low voltage ring to ground. This probably indicates some special circuits such as an alarm system upon the line.

Pair 21, 22, and 25 show an unbalance of 11%, 64%, and 11% respectively. This indicates that the line is vacant, no voltage, high resistance, but with some problem on the line to cause the capacitance of the ring and tip to be different or that there is possibly a special circuit with no battery on the pair.

It will be understood that in addition to printing on paper tape, as shown in FIG. 5, by use of modems this information could be transmitted to other locations. E.g., the inventory function which has been discussed above, could automatically be entered upon the computers where this information is stored, either accounting computers for customer charges or engineering computers which show the different lines and their connection.

Those with ordinary skill in the art will understand that a group could be connected into the new pair connector 18 and a test made from there. Also, groups of 25 pair each could be connected both to the old and new and after the old 25 pair were tested, then the new 25 pair could be tested. Furthermore, instead of printing the results that the results of the the tests of each pair could be visually displayed, however, for automatic testing this would be perhaps too rapid to be checked, and therefore it would be better that this being done manually. Manual testing could be done whereby the operator would press the "MANUAL" pad and then manually select the pair by the dial indicators 56 and 58 on the front panel. The operator would press "START" for each pair which would then display the results as indicated above upon the visual display board. Also, it would be understood by one with ordinary skill in the art that instead of making the entire pretest that at any time desired that any one value such as voltage, resistance or capacitance could be read upon any individual pair.

Furthermore, it would be understood that by use of the capabilities of the unit that results could be transmitted to a remote location. The analyzer could be controlled by a remote location.

Also, actually, the example of the measuring the voltage would be as indicated above that there would be a repeated measurement of the instantaneous voltage by the volt meter 43 in the converter 46. Then each of the values would be converted to binary digital form to be put to the CPU where the several values would be stored in memory. Then, upon the completion of the multiple tests, they would be averaged. Likewise, multiple resistance readings would be taken, converted to binary digital mode, sent to the CPU, stored in memory, then called up to be averaged and used. The same is also true for the capacitance test. Multiple instantaneous readings are made, converted, stored, and averaged.

The embodiment shown and described above is only exemplary. We do not claim to have invented all the parts, elements or steps described. Various modifications can be made in the construction, material, arrangement, and operation, and still be within the scope of our invention.

The limits of the invention and the bounds of the patent protection are measured by and defined in the following claims. The restrictive description and drawing of the specific examples above do not point out what an infringement of this patent would be, but are to enable a person with ordinary skill in the art to make and use the invention.

In this regard, Applicant recognizes that certain program steps have not been included. E.g., Applicant has not described the resetting or erasing of entries into the RAMS at the point they are no longer needed.

As an aid to correlating the terms of the claims to the exemplary drawing, the following catalog of elements and steps is provided:

ELEMENTS

10 Analyzer
12 Batteries
14 Wall Transformer
15 Power Supply
16 Old Plug Connector
18 New Plug Connector
20 Old Receptacle
22 New Receptacle
24 Old Ribbon
26 Old Pair Selector Board
28 New Ribbon
30 New Pair Selector Board
32 Routing Board
34 Old Buss
36 New Buss
38 Bridge Board
40 Central Processing Unit (CPU)
42 Data Buss
43 Volt Meter
44 Port Buss
45 Ohmmeter
46 Analog-Digital Converter
47 Capacitance Meter
48 Key Pad
50 Display Driver
52 Pin Ribbon
54 Front Panel Control
55 Wires
56 Old Pair Selector Dial
58 New Pair Selector Dial
60 Reset Membrane Switch
62 Visual Display Board
64 Printer
66 Generator
68 Probe Receptacle
70 Amplifier Circuit
72 Ground Lug
74 On/Off Switch
76 Volume Control
80 Talk Lugs
82 Talk and Data Receptacle
84 Battery Charge Receptacle
86 Cord Storage Pocket
88 TCX Receptacle
200 Central Office
202 Cable
204 ESS
206 ANI
208 BUSS
210 ANAC
212 Voice Option

STEPS

100 V:RG
102 PRINT
104 V:TG
106 PRINT
108 PRINT
110 R:TG
112 PRINT
114 V:RG
116 PRINT
118 V:TG
120 PRINT
122 R:RG
124 PRINT
126 R:TG
128 PRINT
130 R:RT
132 PRINT
134 C:RG
136 C:TG
138 PRINT
140 C:RG
150 GEN
152 MAKE BUSY
154 WAIT
156 ANIR
158 # TONE
160 RETRIEVE
162 PRINT

I claim as my invention:

1. The process involving a telephone system including
   a. a plurality of line pairs,
   b. some of the line pairs having telephone numbers, said line pairs in
   c. a field with
   d. a central office having
   e. automatic number identification equipment with,
   f. an automatic number announcement converter,
   g. which equipment operates to announce to a line from the field the telephone number of that line in response to a coded message request received on said line;
   h. wherein the improved method comprises:
   i. said automatic number announcement converter responding to the coded message request with a code inquiry, and j. upon the prompt receipt of a machine request in response, k. announcing the telephone number in rapid digital machine readable code.

2. The invention as defined in claim 1 including all of the limitations (a) through (k) wherein l. said coded message request, said inquiry, said response, and said announcement are a communication medium and are all the same machine readable code.

3. The invention as defined in claim 2 including all of the limitations (a) through (l) wherein m. said communication medium is dual tone multiple frequency.

4. The invention as defined in claim 3 including all of the limitations (a) through (m) with the addition of the following limitations:

n. attaching a plurality of line pairs to an analyzer in the field, o. said analyzer individually in turn for each line pair attached to it:

i. determining if the line pair has operating voltage, and if so, then ii. sending said coded message request, iii. responding to said code inquiry, iv. converting the telephone number to binary digital format, and v. printing a line identification and the telephone number in arabic numerals upon a paper tape.

5. The invention as defined in claim 1 including all of the limitations (a) through (k) with the addition of the following limitations:

l. attaching a plurality of lines to an analyzer in the field, m. said analyzer individually in turn for each line attached to it:

i. determining if the line pair has operating voltage, and if so, then ii. sending said coded message request, iii. responding to said code inquiry, iv. converting the telephone number to binary digital format, and v. printing a line identification and the telephone number in arabic numerals upon a paper tape.

6. The invention as defined in claim 5 having all of the limitations (a) through (m) with the addition of the following limitations:

n. determining by said analyzer if each of the line pairs is an in service idle telephone, and i. if the pair is an in service idle telephone pair proceeding to send said coded message request as defined above, and ii. if the pair is not an in service idle telephone pair then proceeding to determine the condition of the pair and print the condition.

7. The invention as defined in claim 5 having all of the limitations (a) through (m) with the addition of the following limitations:

p. determining by said analyzer if each of the line pairs is an in service idle telephone, and i. if the pair is an in service idle telephone pair proceeding to send said coded message request as defined above, and ii. if the pair is not an in service idle telephone pair, then proceeding to determine the condition of the pair and print the condition: specifically, (a) determine if there is voltage on the pair, and if so, (b) print the voltage, and (c) if there is no voltage on the pair, determine if the resistance of the pair is greater than 450K ohms, and (d) if not, printing said resistance, and (e) if the resistance is greater than 450K ohms, determining if the capacitance of the wires of the pair is balanced, and (f) if the capacitance is balanced, printing a distance based upon the the capacitance between the wires of the pair.

* * * * *